United States Patent
Dabak et al.

(10) Patent No.: US 7,796,574 B2
(45) Date of Patent: Sep. 14, 2010

(54) MULTI-CARRIER RECEPTION FOR ULTRA-WIDEBAND (UWB) SYSTEMS

(75) Inventors: Anand G. Dabak, Plano, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 826 days.

(21) Appl. No.: 10/649,260

(22) Filed: Aug. 25, 2003

(65) Prior Publication Data

US 2004/0071118 A1 Apr. 15, 2004

Related U.S. Application Data

(60) Provisional application No. 60/409,662, filed on Sep. 10, 2002.

(51) Int. Cl.
*H04J 11/00* (2006.01)
*H04B 7/204* (2006.01)
*H04B 7/216* (2006.01)

(52) U.S. Cl. ............... 370/342; 370/206; 370/335; 370/319; 375/350

(58) Field of Classification Search ......... 370/203–210, 370/335–342, 471–491; 375/229–232, 350–367, 375/132–144, 340–342, 142–150, 242–262
See application file for complete search history.

(56) References Cited

U.S. PATENT DOCUMENTS

| | | | | |
|---|---|---|---|---|
| 5,881,057 | A * | 3/1999 | Komatsu | 370/335 |
| 6,222,875 | B1 * | 4/2001 | Dahlman et al. | 375/130 |
| 6,459,679 | B1 * | 10/2002 | Kim | 370/208 |
| 6,631,175 | B2 * | 10/2003 | Harikumar et al. | 375/350 |
| 6,714,511 | B1 * | 3/2004 | Sudo et al. | 370/208 |
| 6,771,591 | B1 * | 8/2004 | Belotserkovsky et al. | 370/210 |
| 6,901,112 | B2 * | 5/2005 | McCorkle et al. | 375/259 |
| 6,985,548 | B1 * | 1/2006 | Jabbar et al. | 375/355 |
| 7,010,056 | B1 * | 3/2006 | McCorkle et al. | 375/295 |
| 7,072,411 | B1 * | 7/2006 | Dollard | 375/260 |
| 7,106,781 | B2 * | 9/2006 | Agee et al. | 375/141 |
| 7,184,713 | B2 * | 2/2007 | Kadous et al. | 455/67.13 |
| 7,266,162 | B2 * | 9/2007 | Jiang | 375/326 |

(Continued)

FOREIGN PATENT DOCUMENTS

EP 1 014 639 A 6/2000

OTHER PUBLICATIONS

"Fractionally Spaced Decision Feedback Joint Detection for Multitone CDMA Systems", Vandendorpe, et al., Spread Spectrum Techniques and Applications Proceedings, IEEE 4th International Symposium on Malnz, Germany, Sep. 22-25, 1996, New York, NY, USA, IEEE, vol. 3, pp. 1361-1365, XP010208839, ISBN: 9-7803-3587-8.

*Primary Examiner*—M. Phan
(74) *Attorney, Agent, or Firm*—Ronald O. Neerings; Wade James Brady, III; Frederick J. Telecky, Jr.

(57) ABSTRACT

System and method for receiving transmissions in a wireless communications system. A preferred embodiment comprises a receiver (such as receiver 400) that can despread and then demodulate a symbol from a transmitter that first spread and then modulated the symbol. By reversing the processing order, the demodulation can be performed at a lower data rate and therefore reducing computational and power requirements.

26 Claims, 5 Drawing Sheets

U.S. PATENT DOCUMENTS

| | | |
|---|---|---|
| 7,336,598 B2 * | 2/2008 | Kakura .................. 370/208 |
| 7,366,222 B2 * | 4/2008 | Song et al. ............... 375/130 |
| 7,420,915 B2 * | 9/2008 | Murakami et al. ......... 370/204 |
| 2001/0040912 A1 * | 11/2001 | Gibbons et al. ........... 375/133 |
| 2002/0122465 A1 | 9/2002 | Agee et al. |
| 2002/0168016 A1 * | 11/2002 | Wang et al. .............. 375/260 |
| 2003/0095508 A1 * | 5/2003 | Kadous et al. ............ 370/252 |
| 2004/0017843 A1 * | 1/2004 | Fitton et al. .............. 375/148 |
| 2004/0071199 A1 * | 4/2004 | Boesel et al. ............. 375/150 |
| 2004/0120415 A1 * | 6/2004 | Song et al. ............... 375/262 |
| 2005/0094552 A1 * | 5/2005 | Abe et al. ................ 370/208 |
| 2005/0238108 A1 * | 10/2005 | Suh et al. ................ 375/260 |
| 2005/0259566 A1 * | 11/2005 | Chung et al. ............. 370/204 |
| 2007/0053280 A1 * | 3/2007 | Uesugi .................... 370/208 |
| 2008/0031369 A1 * | 2/2008 | Li et al. .................. 375/260 |

* cited by examiner

MULTI-CARRIER RECEPTION FOR ULTRA-WIDEBAND (UWB) SYSTEMS

CROSS-REFERENCE TO RELATED APPLICATIONS

This application claims the benefit of U.S. Provisional Application No. 60/409,662, filed on Sep. 10, 2002, entitled "Multi Carrier Reception for Ultra Wide Band (UWB) Systems", which application is hereby incorporated herein by reference.

This application relates to the following co-pending and commonly assigned patent application, Ser. No. 10/335,610, filed Jan. 2, 2003, entitled "Multi-Carrier Transmitter for Ultra-Wideband (UWB) Systems" which application is hereby incorporated herein by reference.

TECHNICAL FIELD

The present invention relates generally to a system and method for wireless digital communications systems, and more particularly to a system and method for receiving transmissions in a wireless communications system with a large data bandwidth.

BACKGROUND

Ultra-wideband (UWB) communications systems are normally defined as carrier-less communications systems wherein the bandwidth of the signal being transmitted, $f_B$, is greater than or equal to 0.20 $f_c$, where $f_c$ is the center frequency of the signal being transmitted and has a minimum bandwidth of 500 MHz. Note that this definition is specified by the Federal Communications Commission of the United States. Narrowband communications systems will have a signal bandwidth to center frequency ratio significantly less than that. For example, IEEE 802.11b, a popular narrowband communications system that transmits in the 2.4 GHz ISM (Industrial, Scientific, and Medical) band, has a signal bandwidth of less than 25 MHz. In other words, IEEE 802.11b's signal bandwidth, $f_B$, is on the order of 0.01 $f_c$.

UWB communications systems have been around for a great number of years, and the majority of them fall under one particular classification, they modulate a stream of short-duration pulses (with an approximate duration of 0.2 nanoseconds (ns)), either in time (pulse position modulation (PPM)), amplitude (pulse amplitude modulation (PAM)), or phase angle (bi-phase modulation). While the existing UWB communications systems can achieve reasonably good performance under ideal conditions, the systems also have significant disadvantages.

The Federal Communications Commission (FCC) of the United States has recently approved the use of UWB communications systems in the US in a report and order entitled "In the matter of Revision of Part 15 of the Commission's Rules, Regarding Ultra-Wideband Transmission System, ET Docket 98-153", adopted Feb. 14, 2002, released Apr. 22, 2002. The document is herein incorporated by reference. The report and order requires that UWB systems used in communications systems operate in the 3.1 to 10.6 GHz frequency band and are limited to indoor use or in hand-held devices that can be employed in activities such as peer-to-peer activities. The FCC also specifies a maximum transmit power for the UWB communications systems.

Since the FCC did not restrict UWB communications systems to the use of short duration pulse streams, a variety of UWB communications systems have been proposed. By necessity, these UWB communications systems meet the FCC restrictions. However, they do not all use short duration pulse streams. Rather, they use techniques such as orthogonal frequency division multiplexing (OFDM) and code division multiple access (CDMA) and other methods to help create a high data rate communications network.

Several UWB communications systems combine both OFDM and CDMA together to feature advantages of both techniques in a single communications system. For example, in a typical UWB communications system, data to be transmitted would be spread via multiplication with spreading codes (CDMA) followed by compensation, padding, and conversion into a time domain signal and placed into small frequency ranges (OFDM) prior to transmission. The combination of CDMA and OFDM can increase bandwidth utilization and increased interference resistance while minimizing impact upon adjacent communications networks. For example, OFDM can permit maximization of the use of available bandwidth at different frequency ranges throughout the transmission band by placing as much of the data to be transmitted into each of the multiple small frequency ranges, while the use of CDMA can help to minimize the impact of the transmissions on other communications systems which may be operating within the general vicinity. At the receiver, the CDMA and OFDM would be removed to obtain the transmitted data.

A disadvantage of the prior art is the use of CDMA followed by OFDM in a communications network can result in the need to perform a Fourier transform at chip rate, which can be significantly higher than the actual data rate. Since a Fourier transform can require a large amount of computational power (multiplication and addition of complex numbers), computing a Fourier transform at a rate that is higher than necessary can result in the need for greater computational power. Hence, overall costs (due to the more powerful processing unit) can be higher than necessary.

A second disadvantage of the prior art is that the greater computational power needed by performing the Fourier transform at a rate that is higher than necessary is that the greater power processing unit, combined with the higher clock rate, will typically consume more power. Therefore, the overall power consumption will be greater. In a wireless receiver, this may necessitate a larger battery or a more advanced (and more expensive) battery technology.

SUMMARY OF THE INVENTION

These and other problems are generally solved or circumvented, and technical advantages are generally achieved, by preferred embodiments of the present invention which provides for a system and method for receiving a multi-carrier UWB transmission with reduced power consumption and computational requirements.

In accordance with a preferred embodiment of the present invention, a method comprising receiving a symbol, wherein the symbol is first spread with a spreading code used to spread all symbols to be transmitted and then modulated, stripping redundancy from the symbol, despreading the symbol, and demodulating the symbol.

In accordance with another preferred embodiment of the present invention, a receiver comprising an analog section coupled to a signal input, the analog section containing circuitry to filter and amplify a signal received at the signal input, an analog-to-digital converter (ADC) coupled to the analog section, the ADC to convert an output of the analog section into a digital symbol stream, a digital section coupled to the ADC, the digital section comprising a redundancy elimination circuit (REC) coupled to the ADC, the REC containing circuitry to removed redundancies inserted into a digital symbol, a despreader coupled to the REC, the despreader containing circuitry to apply a spreading code to a digital symbol, one digital symbol at a time, and a demodulator coupled to the despreader, the demodulator containing circuitry to remove modulation applied to the digital symbol.

An advantage of a preferred embodiment of the present invention is that by performing the necessary Fourier transform at a lower data rate, a smaller computational load is placed upon a processing unit of a wireless device. Therefore, a less powerful and less expensive processing unit is needed.

A further advantage of a preferred embodiment of the present invention is that by performing the necessary Fourier transform at a lower data rate, less energy can be used. With a lower energy requirement, a less powerful battery or less advanced battery technology can be employed in a wireless device, again, reducing the overall cost of the wireless device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a UWB receiver using code-division multiple access (CDMA) in combination with orthogonal frequency division multiplexing (OFDM) to create a multi-carrier UWB communications system that operates within the FCC restricted 3.1 to 10.6 GHz frequency band, with the ability to reduce power and computational requirements of the receiver. The invention may also be applied, however, to other UWB receivers for multi-carrier UWB communications systems that are operating in other frequency bands, as well as in other regulatory restrictions.

Figure 1:
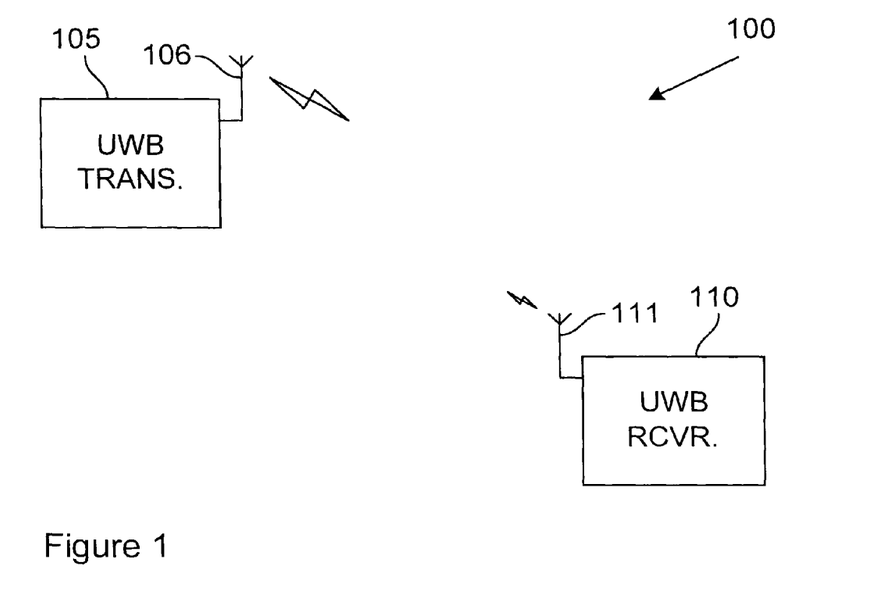
FIG. 1 is a diagram of an exemplary UWB wireless communications system.

With reference now to FIG. 1, there is shown an exemplary UWB wireless communications system 100, made up of a UWB transmitter 105 and a UWB receiver 110. Note that while the UWB wireless communications system 100 is illustrated with a single receiver and transmitter, there can be (and typically there are) more than one receiver and transmitter within a single wireless communications system. Although not shown, there may be other wireless communications systems operating in the general vicinity of the wireless communications system 100. These other wireless communications systems can interfere with communications between the UWB transmitter 105 and the UWB receiver 110. The UWB wireless communications system 100 may often employ techniques such as CDMA, OFDM, or both to help improve spectral utilization and immunity to interference.

Figure 2:
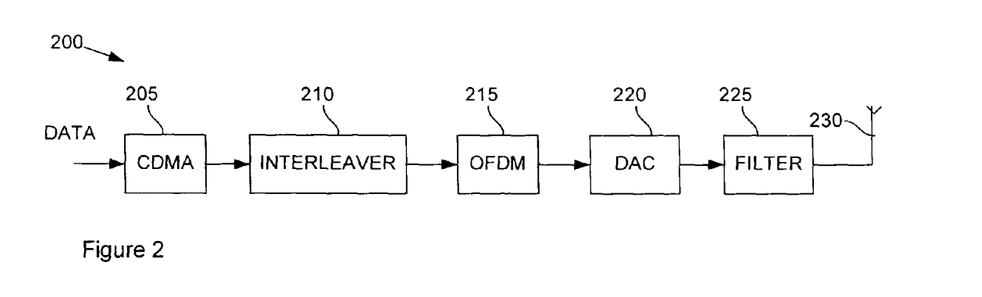
FIG. 2 is a diagram of a portion of a multi-carrier UWB transmitter.

With reference now to FIG. 2, there is shown a portion of a multi-carrier UWB transmitter 200 employing both CDMA and OFDM to help improve spectral utilization and immunity to interference. Note that FIG. 2 illustrates only the portion of the UWB transmitter 200 that is responsible for encoding and modulating the data to be transmitted. Other portions of a transmitter, such as the control logic and glue logic are omitted to simply the illustration.

The UWB transmitter 200 can be partitioned into several different blocks: a CDMA block 205, an interleaver 210, an OFDM block 215, a digital-to-analog converter (DAC) 220, and a filter 225. The CDMA block 205 takes as input, a data stream (in digital form) and applies a spreading code to the data stream. The spreading code is used to take the data stream and encode it in such a way that the data stream consumes a larger amount of spectrum than it normally would, to help increase its tolerance to interference. After spreading, individual units of the spread data stream are referred to as chips. A commonly used spreading code in CDMA systems is known as a Walsh code.

After being spread, the spread data stream is provided to an interleaver 210. The purpose of the interleaver 210 is to increase the tolerance of the communications system to interference by reducing the probability that interference will damage adjacent chips, thereby increasing the probability that any built-in error correction can correct damaged chips. However, rather than simply partitioning the spread data stream into individual portions and hence leaving adjacent chips next to one another, the interleaver 210 takes every J-th chip (where J is defined as the interleaving ration of the interleaver 210) and combines them into J portions.

After being interleaved, the interleaved and spread data stream is provided to the OFDM block 215. The OFDM block 215 takes the interleaved and spread data stream and prepares the data for transmission by adjusting a signal gain at various frequencies within the transmission band to adjust for any frequency sensitivity in a transmit antenna 230, fits the data stream to any required spectral restrictions (such as excluded frequency ranges or detected interferers at certain frequencies, etc.), converts the interleaved and spread data stream into its time domain representation, and creates a cyclic prefix for the data (to make the transmission resistant to inter-symbol interference (ISI)).

The data is ready to be transmitted after it is converted into an analog signal by the DAC 220. According to a preferred embodiment of the present invention, a DAC with a resolution of two (2) to three (3) bits is sufficient to accurately convert the digital signal into an analog signal. The DAC 220 should also be able to operate at a frequency that is at least twice the maximum frequency in the transmitted signal.

After being converted into an analog signal by the DAC 220, the data is filtered by the filter 225. The purpose of the filter 225 is to ensure that the transmitted signal fits within the specified spectral mask as specified by the FCC (and other regulatory bodies). The filter 225 may be a static filter with pre-specified frequency cutoffs and roll off rates or it may be a configurable filter that can be modified to meet the UWB transmitter's operating environment. For example, if the UWB transmitter 220 detects that it is operating in the presence of an interferer, perhaps an IEEE 802.11a wireless network, the filter 225 can be configured to attenuate the UWB transmitter's output signal in the 5.8 GHz UNII band (where the IEEE 802.11a wireless network operates). That said, the filter's main function is to ensure that the data fits within the spectral mask specified by the FCC (or other regulatory bodies). After filtering, the data is transmitted via the antenna 230.

Figure 3:
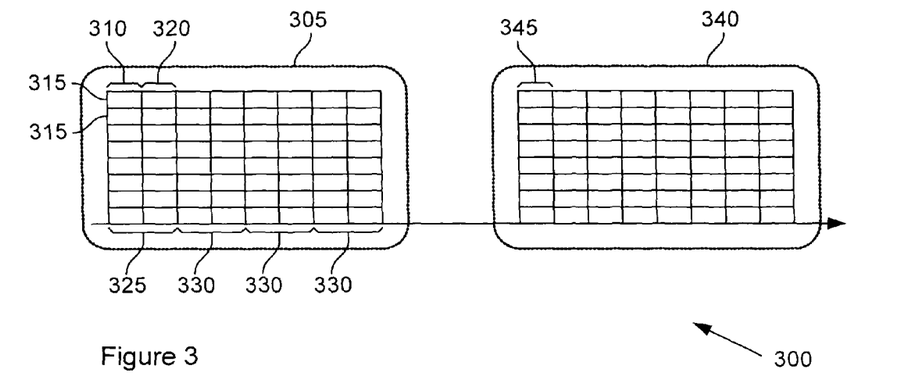
FIG. 3 is a diagram of a time domain view of an exemplary transmitted signal in a multi-carrier UWB wireless communications system.

With reference now to FIG. 3, there is shown a diagram illustrating a time domain view of a digital version of an exemplary transmitted signal for the UWB transmitter 200 (FIG. 2), according to a preferred embodiment of the present invention. FIG. 3 displays two symbols of an exemplary transmitted signal for the UWB transmitter 200 (FIG. 2) prior to it being converted into an analog signal by the DAC 220, e.g., the symbols displayed in FIG. 3 are examples of the output of the OFDM block 215. Taking a detailed view of a first symbol 305, the first symbol 305 is made up of several different parts. A first part is an actual OFDM symbol 310. The OFDM symbol 310 may also be referred to as a data symbol since this symbol contains the data to be transmitted. The OFDM symbol 310 is what would be output from an inverse Fourier transform unit (of the OFDM block 215 (FIG. 2)). The OFDM symbol 310 is, in turn, made up of a series of data blocks, each located at a different frequency range 315 (each rectangle represents a single frequency range). The individual frequency ranges are commonly referred to as a tone. For example, in an exemplary 10 GHz data bandwidth UWB system with 512 individual frequency ranges (tones), then each tone would represent a contiguous frequency range of 40 MHz (2*10 GHz/512).

The OFDM symbol 310 is then duplicated to form a cyclic prefix 320 that is appended to the OFDM symbol 310 to form a composite symbol 325. The composite symbol 325 is then replicated several times (replicated symbols 330) to form the complete first symbol 305. The number of times that composite symbol 325 is replicated is dependent upon the desired size of the symbol, the desired data rate, etc. As displayed in FIG. 3, the first symbol 305 is made up of the composite symbol 325 and three replications of the composite symbol 325, for a total of four (4) copies of the composite symbol. For example, if the OFDM symbol 310 was 512 bits in length, then the composite symbol 325 (and each of its duplicates 330) would be 1024 bits in length and the first symbol 305 would be 1024*4=4096 bits in length. The first symbol 305 as displayed in FIG. 3 is what would be found at the output of a cyclic prefix unit (of the OFDM block 215 (FIG. 2)).

Figure 4:
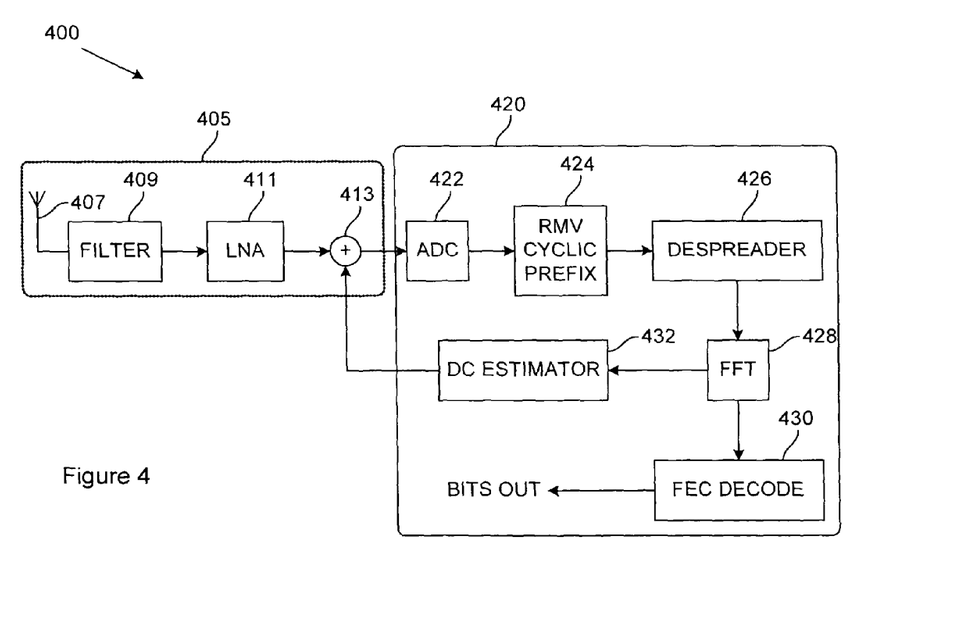
FIG. 4 is a diagram of a portion of a multi-carrier UWB receiver, according to a preferred embodiment of the present invention.

With reference now to FIG. 4, there is shown a diagram illustrating a portion of a multi-carrier UWB receiver 400 employing both CDMA and OFDM to help improve spectral utilization and immunity to interference, according to a preferred embodiment of the present invention. Note that FIG. 4 illustrates only the portion of the UWB receiver 300 that is responsible for decoding and demodulating the received data. Other portions of a receiver, such as the control logic and glue logic are omitted to simplify the illustration.

The UWB receiver 400 can be partitioned into two major sections: an analog section 405 and a digital section 420. The analog section 405 can be responsible for receiving an over-the-air transmission and to perform tasks such as filtering and amplification of the received signal. The digital section 420 can be used to decode and demodulate the received signal once it has been converted into a digital symbol stream and to extract the actual data that was transmitted by a UWB transmitter.

The analog section 405 of the UWB receiver 400 can include an antenna 407, a filter 409, an amplifier 411, and a summing point 413. The antenna 407 can be used to receive the over-the-air transmission, while the filter 409 can be used to remove as much out-of-band interference from the received signal as possible. The amplifier 411 may be used to amplify the received signal to a power level that is suitable for use by the remaining portions of the UWB receiver 400. The summing point 413 can be used in elimination of any DC offset present in the received signal. The summing point 413 combines the received signal with a DC offset estimation that can be provided by the digital section 420 of the UWB receiver 400.

The digital section 420 of the UWB receiver 400 can include an analog-to-digital converter (ADC) 422, a remove cyclic prefix unit 424, a despreader 426, a Fourier transform unit 428, an error correction decode unit 430, and a DC estimator 432. The ADC 422 converts the received signal (preferably after filtering and amplification and removal of any DC offset) into a digital symbol stream. The digital symbol stream, as provided by the ADC 422, can then be provided to the remove cyclic prefix unit 424. The remove cyclic prefix unit 424 can be used to remove repetitions of the symbols, such as the replicated symbols 330 (FIG. 3) and the cyclic prefix 320 (also of FIG. 3). The replicated symbols 330 can be eliminated by coherently combining the multiple replicated symbols. For example, for the symbol 305 (FIG. 3), the three replicated symbols 330 can be coherently combined with the symbol 325. Note that the coherent combination of the replicated symbols can help to mitigate damage occurred during transmission to parts of the symbol.

With any replicated symbols (such as replicated symbols 330) and a cyclic prefix (such as the cyclic prefix 320) removed, what remains of the received signal is a CDMA and OFDM modulated symbol. The CDMA and OFDM modulate symbol may then be provided to the despreader 426, wherein the spreading code used to spread the transmitted data can be removed. Note that although at the transmitter (such as the transmitter 200 (FIG. 2)), the OFDM modulation was applied after the spreading by the spreading code, due to use of the same spreading code for all symbols, the order of the CDMA and OFDM demodulation can be reversed.

After processing by the despreader 426, all that remains to be done to the received signal is to remove the OFDM modulation. The OFDM demodulation may be performed in a Fourier transform unit 428. According to a preferred embodiment of the present invention, the Fourier transform unit 428 implements a class of Fourier transform algorithms commonly referred to as Fast Fourier Transforms (FFTs). Since the despreader 426 reduced the spectral space consumed by the received signal, the OFDM demodulation (performed by via a Fourier transform on the received signal) operates on a smaller amount of information. The net effect of reversing the CDMA and OFDM demodulation operation is to reduce the number of computations required to perform the OFDM demodulation.

Upon completion of the OFDM demodulation (a Fourier transform), the received data may be provided to an error correcting decoder 430 to remove any error encoding applied to the data to help increase resistance to errors. According to a preferred embodiment of the present invention, the error correcting decoder 430 implements a decoder for the decoding of forward error correction codes (FEC). Output of the error correcting decoder 430 can be data bits that can be usable by devices coupled to the UWB receiver 400, such as computers and peripherals, personal digital assistants, multimedia devices, audio and video appliances, and so forth.

Output of the Fourier transform unit 428 can also be provided to the DC estimator 432. The DC estimator 432 can be used to create an estimate of any DC offset present in the received data. The DC estimate can then be provided to the summing point 413 where it can be eliminated from the received signal. Note that more elaborate DC offset elimination schemes may be implemented in the UWB receiver 400. While DC offset elimination is important in receivers, it is not part of the preferred embodiment of the present invention and the present invention may remain operable without the inclusion of a DC offset elimination scheme. DC offset elimination (and its importance in receivers) is considered well understood by those of ordinary skill in the art of the present invention.

Figure 5:
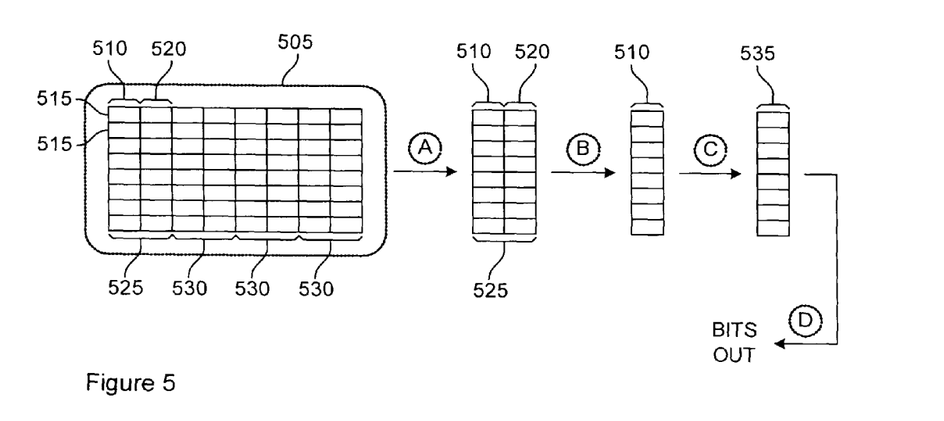
FIG. 5 is a diagram of a time domain view of an exemplary received signal in a multi-carrier UWB wireless communications system as it undergoes processing in a UWB receiver, according to a preferred embodiment of the present invention.

With reference now to FIG. 5, there is shown a diagram illustrating a time domain view of a digital version of an exemplary received signal at a UWB receiver (such as the UWB receiver 400 (FIG. 4)) as it undergoes processing in the UWB receiver 400, according to a preferred embodiment of the present invention. FIG. 5 displays a symbol 505 of the received signal after it has been converted back into its digital representation, for example, at the output of the ADC 422 (FIG. 4). Similar to symbol 305 (FIG. 3), the symbol 505 can be made up of several parts: an OFDM symbol 510 (made up of data in different frequency ranges 515) with a cyclic prefix 520 combined to form a composite symbol 525 and several replicated symbols 530 which are duplicates of the composite symbol 525.

After an initial processing (point A), the replicated symbols 530 can be combined with the composite symbol 525 to create a single symbol (which should be identical to the composite symbol 525). According to a preferred embodiment of the present invention, the replicated symbols 530 and the composite symbol 525 can be combined coherently in a remove cyclic prefix unit (such as the remove cyclic prefix unit 424 (FIG. 4)). The remove cyclic prefix unit 424 can also be used to remove the cyclic prefix of the composite symbol 525 (displayed as symbol 510 (after a second processing (point B)).

The symbol 510 can then be provided to a despreader (such as the despreader 426 (FIG. 4)). In the despreader 426, the spreading code used at a transmitter can be removed. The symbol 510 after being despread (a third processing (point C)) is displayed as symbol 535. The symbol 535 may then be provided to a Fourier transform unit (such as the Fourier transform unit 428 (FIG. 4)), wherein the OFDM modulation can be removed. As a result of the processing by the Fourier transform unit 428 (a fourth processing (point D)), the symbol 535 can become data bits that can be used by devices coupled to the UWB receiver 400. Note that after the processing by the Fourier transform unit 428, the symbol may undergo additional processing to remove any error correction encoding that may have been applied at the transmitter to help improve the error resistance of the transmission.

Since the FCC has specified that a UWB communications system can operate within a frequency range of 7.5 GHz (from 3.1 GHz to 10.6 GHz), it is possible to create a UWB communications system that uses only a portion of the total available frequency range. A possible reason to use only a portion of the available frequency range would be to specifically avoid known interferers. Furthermore, a UWB communications system may transmit in multiple frequency ranges inside the permitted frequency range. For example, a UWB communications system may use frequency ranges from 3.1 to 4.1 GHz, 4.5 to 5.5 GHz, and 8.0 to 10.6 GHz. In such a situation, a UWB receiver may be able to select each of the frequency ranges and operate on each of the frequency ranges separately rather than process the entire 7.5 GHz frequency range as a single entity.

Figure 6:
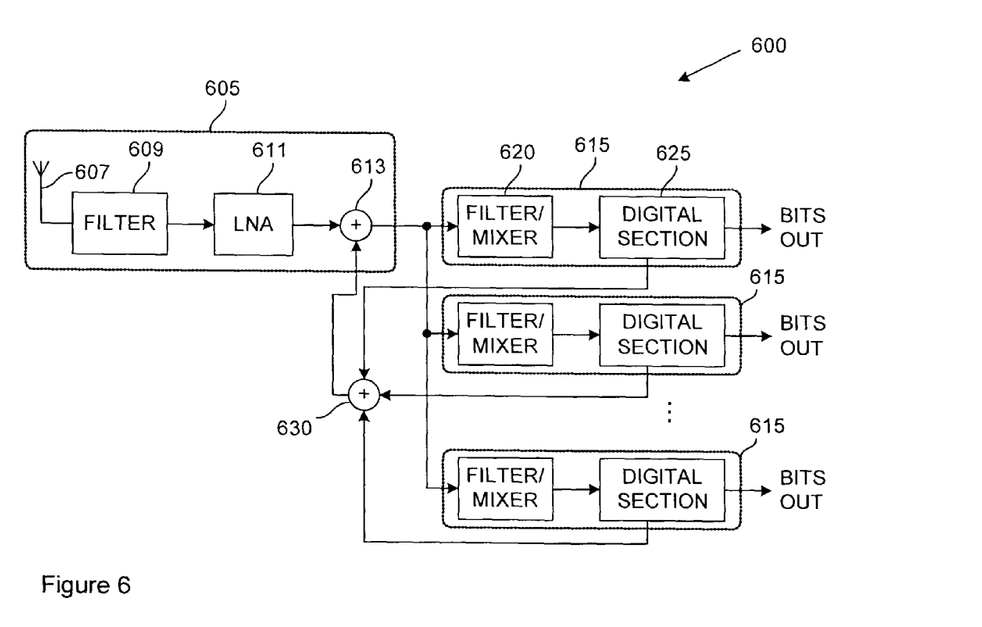
FIG. 6 is a diagram of a portion of a UWB receiver that can receive and process transmissions that are transmitted in individual frequency ranges.

With reference now to FIG. 6, there is shown a diagram illustrating a portion of a UWB receiver 600 that can receive and process transmissions that are transmitted in individual frequency ranges, according to a preferred embodiment of the present invention. According to a preferred embodiment of the present invention, the UWB receiver 600 may have an analog section 605 that can be responsible for receiving an over-the-air transmission and to perform tasks such as filtering and amplification of the received signal. The analog section 605 may be similar to the analog section 205 (FIG. 2) of the UWB receiver 200 that process the received signal as a single entity. Note that in the case of the analog section 605, filtering done to eliminate as much out of band noise and interference would likely attempt to filter out everything outside of the entire frequency band.

Coupled to the analog section 605, there may be multiple frequency band processors 615. According to a preferred embodiment of the present invention, there may be as many frequency band processors 615 as there are expected frequency transmission bands. For example, if a UWB transmitter is expected to use up to five frequency transmission bands, then UWB receiver 600 would have five frequency band processors 615. The frequency band processor 615 can include a filter/mixer unit 620 and a digital section 625. The filter/mixer unit 620 can be used to first filter the received signal to eliminate signals outside of the band of interest and the down-convert the filtered signal. The digital section 625 can be used to decode and demodulate the received signal once it has been converted into a digital symbol stream and to extract the actual data that was transmitted by a UWB transmitter. Note that the digital section 625 can be identical to the digital section 420 (FIG. 4). Additionally, a DC estimate may be produced by each digital section 625 in the various frequency band processors 615. These DC estimates can be combined together at a summing point 630 and then subtracted from the received signal at another summing point 613.

Figure 7:
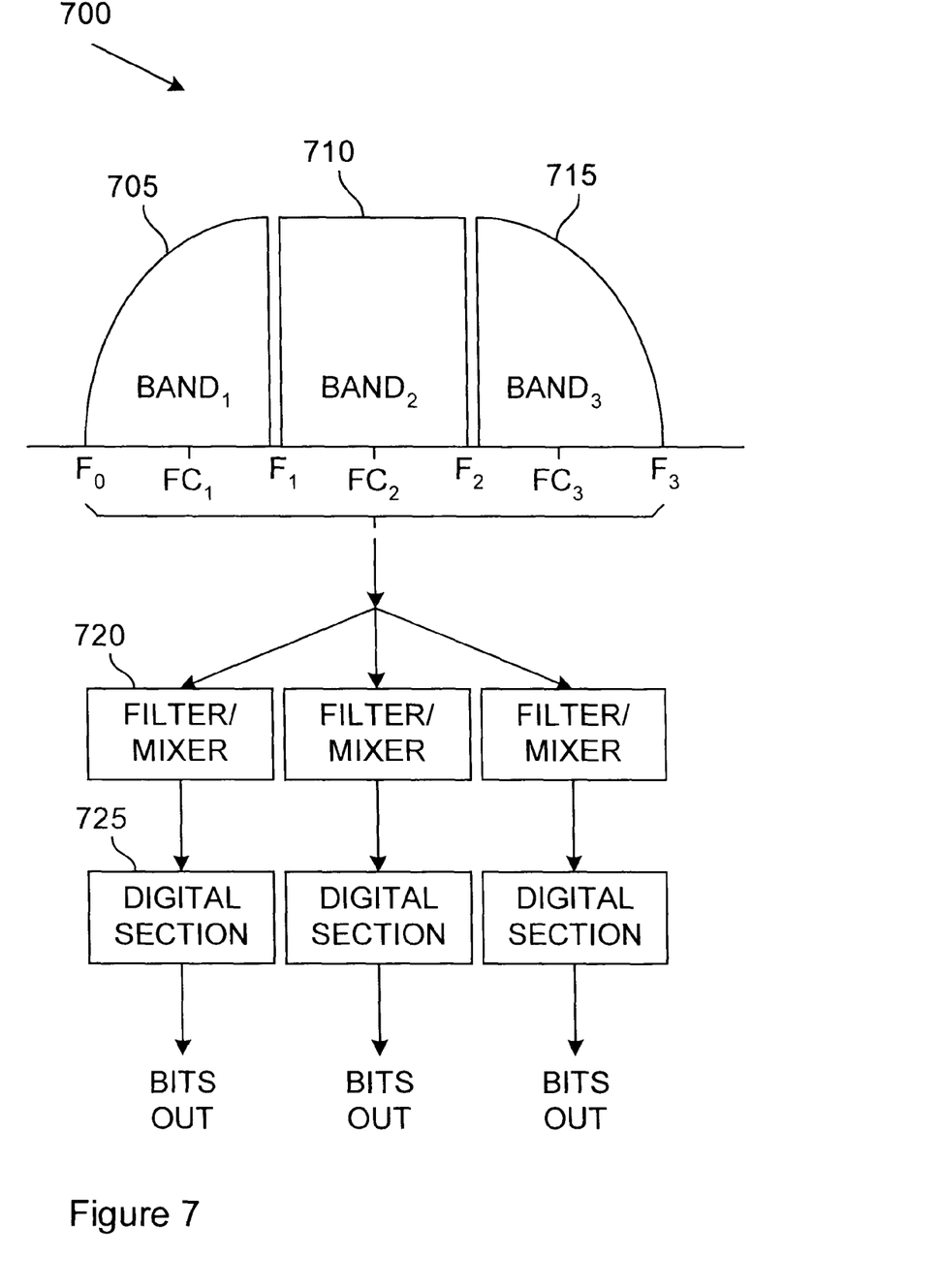
FIG. 7 is a diagram of an exemplary UWB transmission that is made up of multiple frequency bands, according to a preferred embodiment of the present invention.

With reference now to FIG. 7, there is shown a diagram illustrating an exemplary UWB transmission 700 made up of multiple frequency bands being separated and then processed individually, according to a preferred embodiment of the present invention. The UWB transmission 700 is displayed in FIG. 7 as being made up of three individual frequency bands (bands 705, 710, and 715). Note that the number of individual frequency bands can vary and may be less than or greater than three. The UWB transmission 700 can be provided to each of three frequency band processors (such as the frequency band processors 615 (FIG. 6)). In each of the frequency band processors, the UWB transmission 700 can be filtered and mixed (for example, in a filter/mixer 720) and then CDMA and OFDM demodulated (for example, in a digital section 725) to produce data bits. Note that the filtering and mixing for each of the frequency bands may be different, depending on the bandwidth of each frequency band and its center frequency. The data bits produced by the frequency band processors may be combined together by additional hardware (not shown) that can be used to place the data bits in a correct order and so forth.

Figure 8:
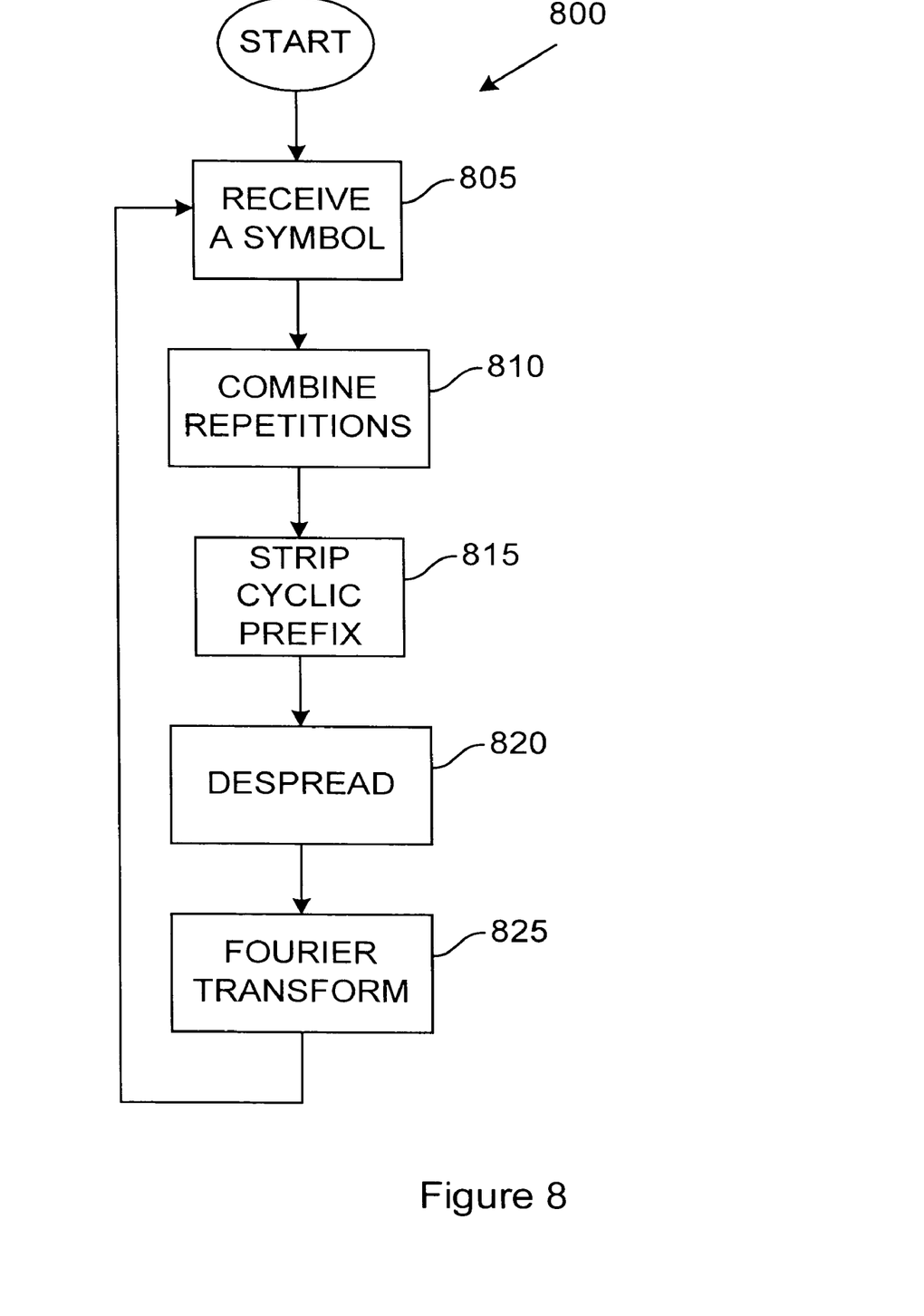
FIG. 8 is a flow diagram of processing received by a received UWB signal, according to a preferred embodiment of the present invention.

With reference now to FIG. 8, there is shown a flow diagram illustrating processing received by a received UWB signal, according to a preferred embodiment of the present invention. According to a preferred embodiment of the present invention, the UWB signal undergoes the processing illustrated in the flow diagram on a per symbol basis. This can be dependent upon the application of the spreading codes at the transmitter. Alternatively, the processing may occur on a block or frame basis, assuming that the application of the spreading codes at the transmitter is on a block or frame basis.

The processing of the UWB signal, as it is received at a UWB receiver (such as the UWB receiver 200 (FIG. 2)), begins when the UWB receiver 200 receives a complete symbol (block 805). Once a complete symbol is received, a first processing step that the symbol may undergo involves the combination of any replicated symbols in the complete symbol. According to a preferred embodiment of the present invention, the complete symbol has several replicated symbols along with an actual symbol created from the data to be transmitted. The combination of the replicated symbols in the complete may involve coherently combining the replicated symbols with the actual symbol.

After coherently combining the replicated symbols with the actual symbol, the cyclic prefix can be stripped (block 810). After the cyclic prefix is stripped, the symbol can be despread to remove the CDMA modulation (block 815). After despreading, the OFDM modulation can be removed by performing a Fourier transform on the symbol (block 820). According to a preferred embodiment of the present invention, the Fourier transform can be implemented as a Fast Fourier Transform (FFT). Data bits can be the output of the Fourier transform. The data bits, if encoded with an error correcting code may need to undergo further processing to remove the error correcting codes. However, if no addition codes were applied to the data, the output of the Fourier transform can be used by devices coupled to the UWB receiver.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    receiving a symbol, wherein the symbol is first spread with a spreading code used to spread all symbols to be transmitted and then modulated;
    stripping redundancy from the symbol after the receiving the symbol;
    despreading the symbol after the stripping the redundancy from the symbol; and
    orthogonal frequency division multiplexing (OFDM) demodulating the symbol.

2. The method of claim 1, wherein the symbol is transmitted over-the-air.

3. The method of claim 1, wherein the symbol comprises a data symbol, a cyclic redundancy, and at least one replicated symbol, and wherein the stripping comprises:
    removing replicated symbols; and
    eliminating a cyclic redundancy.

4. The method of claim 3, wherein the removing comprises coherently combining the replicated symbol with the data symbol and the cyclic redundancy.

5. The method of claim 4, wherein the replicated symbol is a copy of the data symbol and the cyclic redundancy.

6. The method of claim 3, wherein the eliminating comprises discarding of the cyclic redundancy.

7. The method of claim 1, wherein the despreading comprises applying a spreading code to the symbol.

8. The method of claim 7, wherein the symbol comprises a data symbol, a cyclic redundancy, and at least one replicated symbol, and wherein the spreading code is applied to the data symbol.

9. The method of claim 7, wherein the spreading code applied to the symbol is a copy of a spreading code applied to the symbol at a transmitter.

10. The method of claim 1, wherein the modulation applied to the symbol is orthogonal frequency division multiplexing (OFDM).

11. The method of claim 10, wherein the demodulating comprises applying a Fourier transform to the symbol.

12. The method of claim 11, wherein the Fourier transform is a Fast Fourier Transform.

13. The method of claim 1, wherein at a transmitter, the spreading code is applied to symbols on a symbol by symbol basis prior to transmission.

14. A method comprising:
    receiving a symbol, wherein the symbol is first spread with a spreading code used to spread all symbols to be transmitted and then modulated, wherein the receiving comprises:
        receiving an analog signal;
        extracting a plurality of frequency bands from the analog signal;
        mixing each of the frequency bands to an intermediate frequency; and
        converting each of the frequency bands into a digital symbol stream;
    stripping redundancy from the symbol after the receiving the symbol;
    despreading the symbol after the stripping the redundancy from the symbol; and
    orthogonal frequency division multiplexing (OFDM) demodulating the symbol.

15. The method of claim 14, wherein the stripping, despreading, and demodulating are performed to digital symbols in each of the digital symbol streams.

16. A receiver comprising:
- an analog section coupled to a signal input, the analog section containing circuitry to filter and amplify a signal received at the signal input;
- an analog-to-digital converter (ADC) coupled to an output of the analog section, the ADC to convert an output of the analog section into a digital symbol stream; and
- a digital section coupled to an output of the ADC, the digital section comprising
  - a redundancy elimination circuit (REC) coupled to the ADC, the REC containing circuitry to remove redundancies inserted into a digital symbol;
  - a despreader coupled to an output of the REC, the despreader containing circuitry to apply a second spreading code to a digital symbol, one digital symbol at a time; and
  - an orthogonal frequency division multiplexing (OFDM) demodulator coupled to an output of the despreader, the demodulator containing circuitry to remove modulation applied to the digital symbol.

17. The receiver of claim 16, wherein at a transmitter, symbols to be transmitted are first spread with a first spreading code and then modulated.

18. The receiver of claim 17, wherein at the transmitter, each symbol is spread with the first spreading code.

19. The receiver of claim 17, wherein the second spreading code is a copy of the first spreading code.

20. The receiver of claim 16, wherein the REC contains circuitry to remove replicated symbols and cyclic redundancies.

21. The receiver of claim 16, wherein at a transmitter, symbols to be transmitted are modulated using orthogonal frequency division multiplexing (OFDM), and wherein the demodulator applies a Fourier transform to the digital symbol.

22. The receiver of claim 21, wherein the Fourier transform is a Fast Fourier Transform.

23. The receiver of claim 16, wherein the digital section further comprises an error correcting code decoder coupled to the demodulator, the error correcting code decoder containing circuitry to remove an error correcting code applied to the digital symbol.

24. A receiver comprising:
- an analog section coupled to a signal input, the analog section containing circuitry to filter and amplify a signal received at the signal input;
- an analog-to-digital converter (ADC) coupled to an output of the analog section, the ADC to convert an output of the analog section into a digital symbol stream;
- a digital section coupled to an output of the ADC, the digital section comprising
  - a redundancy elimination circuit (REC) coupled to the ADC, the REC containing circuitry to remove redundancies inserted into a digital symbol;
  - a despreader coupled to an output of the REC, the despreader containing circuitry to apply a second spreading code to a digital symbol, one digital symbol at a time; and
  - an orthogonal frequency division multiplexing (OFDM) demodulator coupled to an output of the despreader, the demodulator containing circuitry to remove modulation applied to the digital symbol; and
- wherein there are a plurality of ADC and digital sections forming a plurality of ADC and digital units (ADU), and the receiver further comprises a plurality of filters and mixer units, wherein each filter and mixer unit has an input coupled to the analog section and an output coupled to an ADU, the filter and mixer unit containing circuitry to extract a frequency band from a signal provided by the analog section and to mix the frequency band to an intermediate frequency.

25. The receiver of claim 16, wherein the receiver is part of an ultra-wideband (UWB) communications system.

26. A receiver comprising:
- an analog section coupled to a signal input, the analog section containing circuitry to filter and amplify a signal received at the signal input;
- an analog-to-digital converter (ADC) coupled to an output of the analog section, the ADC to convert an output of the analog section into a digital symbol stream;
- a digital section coupled to an output of the ADC, the digital section comprising:
  - a redundancy elimination circuit (REC) coupled to the ADC, the REC containing circuitry to remove redundancies inserted into a digital symbol;
  - a despreader coupled to an output of the REC, the despreader containing circuitry to apply a second spreading code to a digital symbol, one digital symbol at a time; and
  - an orthogonal frequency division multiplexing (OFDM) demodulator coupled to an output of the despreader, the demodulator containing circuitry to remove modulation applied to the digital symbol; and
- wherein the receiver is part of a multi-carrier ultra-wideband (UWB) communications system.

* * * * *